US005805899A

United States Patent [19]

Evans et al.

[11] Patent Number: 5,805,899

[45] Date of Patent: Sep. 8, 1998

[54] METHOD AND APPARATUS FOR INTERNAL VERSIONING OF OBJECTS USING A MAPFILE

[75] Inventors: Rodrick I. Evans, Mountain View; Robert A. Gingell, Sunnyvale, both of Calif.

[73] Assignee: Sun Microsystems, Inc., Palo Alto, Calif.

[21] Appl. No.: 499,062

[22] Filed: Jul. 6, 1995

[51] Int. Cl.[6] .......... G06F 9/45

[52] U.S. Cl. .......... 395/712

[58] Field of Search .......... 395/705, 653, 395/701, 712, 710

[56] References Cited

U.S. PATENT DOCUMENTS

| | | | |
|---|---|---|---|
| 4,742,450 | 5/1988 | Duvall et al. | 364/200 |
| 4,809,170 | 2/1989 | Leblang et al. | 395/703 |
| 4,875,159 | 10/1989 | Cary et al. | 364/200 |
| 4,887,204 | 12/1989 | Johnson et al. | 364/200 |
| 4,912,637 | 3/1990 | Sheedy et al. | 364/300 |
| 4,914,569 | 4/1990 | Levine et al. | 364/200 |
| 5,001,628 | 3/1991 | Johnson et al. | 364/200 |
| 5,077,658 | 12/1991 | Bendert et al. | 395/600 |
| 5,093,779 | 3/1992 | Sakurai | 395/600 |
| 5,313,646 | 5/1994 | Hendricks et al. | 395/600 |
| 5,381,547 | 1/1995 | Flug et al. | 395/685 |
| 5,446,899 | 8/1995 | Brett | 395/705 |
| 5,613,101 | 3/1997 | Lillich | 395/500 |
| 5,630,138 | 5/1997 | Raman | 395/712 |
| 5,634,114 | 5/1997 | Shipley | 395/712 |

FOREIGN PATENT DOCUMENTS

| | | | |
|---|---|---|---|
| A 0 498 130 A2 | 8/1992 | European Pat. Off. . | |
| A 0 546 683 | 6/1993 | European Pat. Off. . | |
| WO 94/25918 | 11/1994 | WIPO | 395/500 |

OTHER PUBLICATIONS

Conference on Software Maintenance, Oct. 24–27, 1988, Phoenix, Institute of Electrical and Electronics Engineers, pp. 126–131, L.H. Greene: "Self–Identifying Software".

Lewis, B.T., "Experience with a System for Controlling Software Versions in a Distributed System for Controlling Software Versions in a Distributed Environment," IEEE, Proc. of the Symp. on App. & Assess. of Auto. Tools. for Soft. Dvlp., pp. 1–19, Nov. 3, 1983.

Article by Sandberg et al., entitled "Design and Implementation of the Sun Network Filesystem" Usenix Summer '85 Conference Proceedings, pp. 119–130.

Article by Brian T. Lewis, entitled "Experience with a System for Controlling Software Versions in a Distributed Environment" IEEE, Proceedings of the Symposium on Application and Assessment of Automated Tools for Software Development, Nov. 1–3, 1983, San Francisco.

Article by Roger Gregory entitled "Xanadu Hypertext from the Future" Dr. Dobb's Journal, No. 75, Jan. 1983, pp. 28–35.

(List continued on next page.)

*Primary Examiner*—Emanuel Todd Voeltz
*Assistant Examiner*—Peter J. Corcoran, III
*Attorney, Agent, or Firm*—Graham & James LLP

[57] ABSTRACT

A method and apparatus for providing versioning information for a plurality of software objects. When an object is compiled and linked, at build time, the link-editor creates a version definition section and a version symbol section in the object that specify the global symbols defined in various versions of the object. The object can be a shared object, a relocatable object, or a dynamic executable object. When an application software program is linked with the versioned object, at build time, the linker-editor creates a version dependency section in the resulting dynamic executable object that specifies which version of the object is required for execution of the software application program. At runtime, the runtime-linker determines whether all required versions of the object are present before the program is executed. The invention allows the definition of "weak" versions that do not contain new global symbols. The invention also allows the explicit specification of the version of an object to which the software application program should be linked.

19 Claims, 20 Drawing Sheets

OTHER PUBLICATIONS

Article by Jeffrey C. Huskamp entitled "A Modular Operating System for the CRAY–1" Software Practice and Experience, vol. 16(12), Dec. 1986, pp. 1059–1076.

Article by Walter F. Tichy, entitled "RCS—A System for Version Control" Software Practice and Experience, vol. 15(7), Jul. 1985. pp. 637–654.

McGilton et al., "Introducing the Unix System" published by McGraw–Hill Software Series for Computer Professionals, 1983, pp. 74–78.

Link-Editor Creates Version Definition Section and Version Symbol Section

Details of Creating Version Definition Section

```
[<version name>]  {
        [<scope>:]
                [<symbol(s)>];
                        } [<inheritance information>] ;
```

Fig. 4

Format of link directives
(version definitions) (in mapfile)

ELF Object File Format

Version Definition Section Format

Version Symbol Section format

Link-Editor Creates Version Dependency Section

<object name> - <version(s)>;

Fig. 9

Format of link directives
(version control directives)
(in mapfile)

ELF Object File (a dynamic executable) output from link-editor)

Version Dependency Section Format

Section header format

```
typedef struct {
        Elf32_Word        sh_name;        1202
        Elf32_Word        sh_type;        1204
        Elf32_Word        sh_flags;
        Elf32_Addr        sh_addr;
        Elf32_Off         sh_offset;
        Elf32_Word        sh_size;        1206
        Elf32_Word        sh_link;        1208
        Elf32_Word        sh_info;        1210
        Elf32_Word        sh_addralign;
        Elf32_Word        sh_entsize;
} Elf32_Shdr;
```

Fig. 12

Section Types, sh_type

| Name | Value |
|---|---|
| SHT_NULL | 0 |
| SHT_PROGBITS | 1 |
| SHT_SYMTAB | 2 |
| SHT_STRTAB | 3 |
| SHT_RELA | 4 |
| SHT_HASH | 5 |
| SHT_DYNAMIC | 6 |
| SHT_NOTE | 7 |
| SHT_NOBITS | 8 |
| SHT_REL | 9 |
| SHT_SHLIB | 10 |
| SHT_DYNSYM | 11 |
| SHT_SUNW_verdef | 0x6ffffffd |
| SHT_SUNW_verneed | 0x6ffffffe |
| SHT_SUNW_versym | 0x6fffffff |
| SHT_LOPROC | 0x70000000 |
| SHT_HIPROC | 0x7fffffff |
| SHT_LOUSER | 0x80000000 |
| SHT_HIUSER | 0xffffffff |

Fig. 13 sh_link and sh_info Interpretation

| sh_type | sh_link | sh_info |
|---|---|---|
| SHT_DYNAMIC | The section header index of the associated string table. | 0 |
| SHT_HASH | The section header index of the associated symbol table. | 0 |
| SHT_REL<br>SHT_RELA | The section header index of the associated symbol table. | The section header index of the section to which the relocation applies. |
| SHT_SYMTAB<br>SHT_DYNSYM | The section header index of the associated string table. | One greater than the symbol table index of the last local symbol (binding STB_LOCAL). |
| SHT_SUNW_verdef | The section header index of the associated string table. | The number of version definitions within the section. |
| SHT_SUNW_verneed | The section header index of the associated string table. | The number of version dependencies within the section. |
| SHT_SUNW_versym | The section header index of the associated symbol table. | 0 |
| other | **SHN_UNDEF** | 0 |

Runtime Verification

1700

Version Symbol Section
(for libfoo.so.1)

Symbol Table (for libfoo.so.1)

| section header | |
|---|---|
| 1 | edata |
| ... | ... |
| 2 | SUNW.1.1 |
| ... | ... |
| 2 | foo1 |
| ... | ... |
| 3 | foo2 |
| ... | ... |
| 0 | <local symbol> |
| ... | ... |
| 5 | bar1 |
| ... | |
| 6 | bar2 |
| ... | ... |
| 7 | bar3 |
| ... | ... |

Version Dependency Section

METHOD AND APPARATUS FOR INTERNAL VERSIONING OF OBJECTS USING A MAPFILE

BACKGROUND OF THE INVENTION

This invention relates to a method and apparatus for linking software programs and, more specifically, to a method and apparatus for providing a dynamic linking system to manage changes in successive versions of a software program.

Software development is an on-going process. A first version of software may be adequate for a task at the time the software is written, but may need upgrading as time goes by and additional features are added. The software development process is especially problematic when a software application binds to shared objects (also called "libraries"). When a shared object is updated or changed, the interface to the shared object is often updated or changed as well. In addition, it is often the case that, even if the interface to a shared object does not change, some portion of the function performed by the shared object changes.

Some conventional systems dynamically link application software programs to shared objects at runtime. In such systems, an application software program that accesses a shared object must be carefully checked every time a new version of the shared object is released. The application software program must be checked to determine that it does not use an interface to the shared object that no longer exists in the new version of the shared object. The application software program also must be checked to determine that the operation of the shared object has not changed (even if the interface to the shared object remains the same).

Conventionally, this checking often is done by a human being. Errors caused by mismatched interfaces are often discovered only during execution of the application software program when an interface mismatch is found or when a shared object does not function the way it used to. What is needed is a way of determining which version of a shared object a particular application software program "expects" to link to and a way of checking whether the expected version of the shared object is present during dynamic linking at runtime.

Conventionally, the filename of the shared object itself is updated for each new version. Thus, only a most recent version of the shared object is present during linking and the most recent version has a completely different filename from an older version of the object. It would be desirable to avoid renaming an object each time a new version of the object is created.

Conventional systems often try to avoid version checking by releasing application programs and shared objects (libraries) as a "whole system," i.e., a new application is shipped with all of its needed shared objects, regardless of whether there has been any change between versions of the shared objects. It would be desirable to be able to upgrade only those parts of the system that are necessary to accommodate a change.

SUMMARY OF THE INVENTION

The present invention provides a method and apparatus for dynamically linking software programs. The invention provides a versioning system to keep track of changes in successive versions of objects accessed by application software programs. The invention checks the interfaces used by the application software program to access versioned objects and detects attempts by the application software program to access an invalid version of the versioned object. The present invention, thus, allows for a controlled evolution of objects, while maintaining backward compatibility between application programs and objects.

The invention provides a versioning system that allows symbolic interfaces and implementation changes to be labelled within an object. At build time, a link-editor adds data to a versioned object defining all available versions of the object (a version definition section and a version symbol section). At build time the link-editor adds data to the software application defining the version requirements of the application S (a version dependency section). At runtime, a runtime linker verifies that the requirements of the software application match the version definition stored in the objects themselves, i.e., that the versioned object needed by the software application is available to the runtime linker.

A version is a name or label recorded in an object. A version may be associated with one or more global symbols—in which case it defines a symbolic interface. Otherwise, a version can simply be an indicator of an implementation change, i.e., of a change in which the functionality of an object changes, but no new global symbols are defined. In this latter case, the version is termed a "weak" version. In the described embodiment of the invention, the global symbols and version names associated with each version are defined in a "mapfile" generated by a human being. The mapfile is input to the link-editor at build time along with one, or more, relocatable (compiled) objects to create a versioned object. By default, at build time, when an application is link-edited with a versioned object that contains versioning information, a dependency is established in the application to those versions that include the global symbols referenced by the application. In addition, a "weak" dependency is established to any weak definitions.

The present invention allows inheritance of version definitions within an object. Versions inherit versions and, thus, symbol sets can be combined to produce interrelated interface definitions. For example, a new version might inherit all of the global symbols of an older version. The present invention can control the visibility of an object's versions during a link-edit, in effect controlling those interfaces available to the application program. The present invention also can force the application software program to require a weak version of an object.

As described herein, the present invention is a method for providing versioning information in a software program, comprising the steps of: providing first object code for a first software program; providing a mapfile specifying a version name associated with a version of the first software program; and linking the first object code, so that an addition is made to the first object code, in accordance with the mapfile, of information defining the version name of the version of the first software program, to yield a versioned object.

As described herein, the present invention is an apparatus for providing versioning information in a software program, comprising: a storage medium holding object code for a first software program; a storage medium holding a mapfile specifying a version name associated with a version of the first software program; and a linker configured to provide additional information in the first object code, in accordance with the mapfile, the additional information defining the version name of the version of the first software program, to yield a versioned object.

As described herein, the present invention is a computer program product, comprising: a computer usable medium having computer readable code embodied therein for causing a determination that a version of an object required by a dynamic executable program is present during execution of the dynamic executable program, the computer program product comprising: computer readable program code devices configured to cause a computer to effect provision of first object code for a first software program; computer readable program code devices configured to cause a computer to effect provision of a mapfile specifying a version name associated with a version of the first software program; and computer readable program code devices configured to cause a computer to effect linking the first object code, so that an addition is made to the first object code, in accordance with the mapfile, of information defining the version name of the version of the first software program, to yield a versioned object.

Various advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein:

FIG. 2(*d*) is a diagram showing inputs and outputs of a runtime-linker program of FIG. 1 at runtime.

FIG. 4 shows a format of a mapfile of FIG. 2(*a*).

FIG. 9 shows a format of a mapfile of FIG. 2(*c*).

FIG. 12 shows a format of a header section of FIGS. 6, 7, and 11.

FIG. 13 is a listing of values in the header of FIG. 12.

FIG. 14 a listing of values in the header of FIG. 12.

DETAILED DESCRIPTION OF THE PREFERRED EMBODIMENTS

The following description is of the best presently contemplated mode of carrying out the invention. This description is made for the purpose of illustrating the general principles of the invention and is not to be taken in a limiting sense.

1. General Discussion

Figure 1:
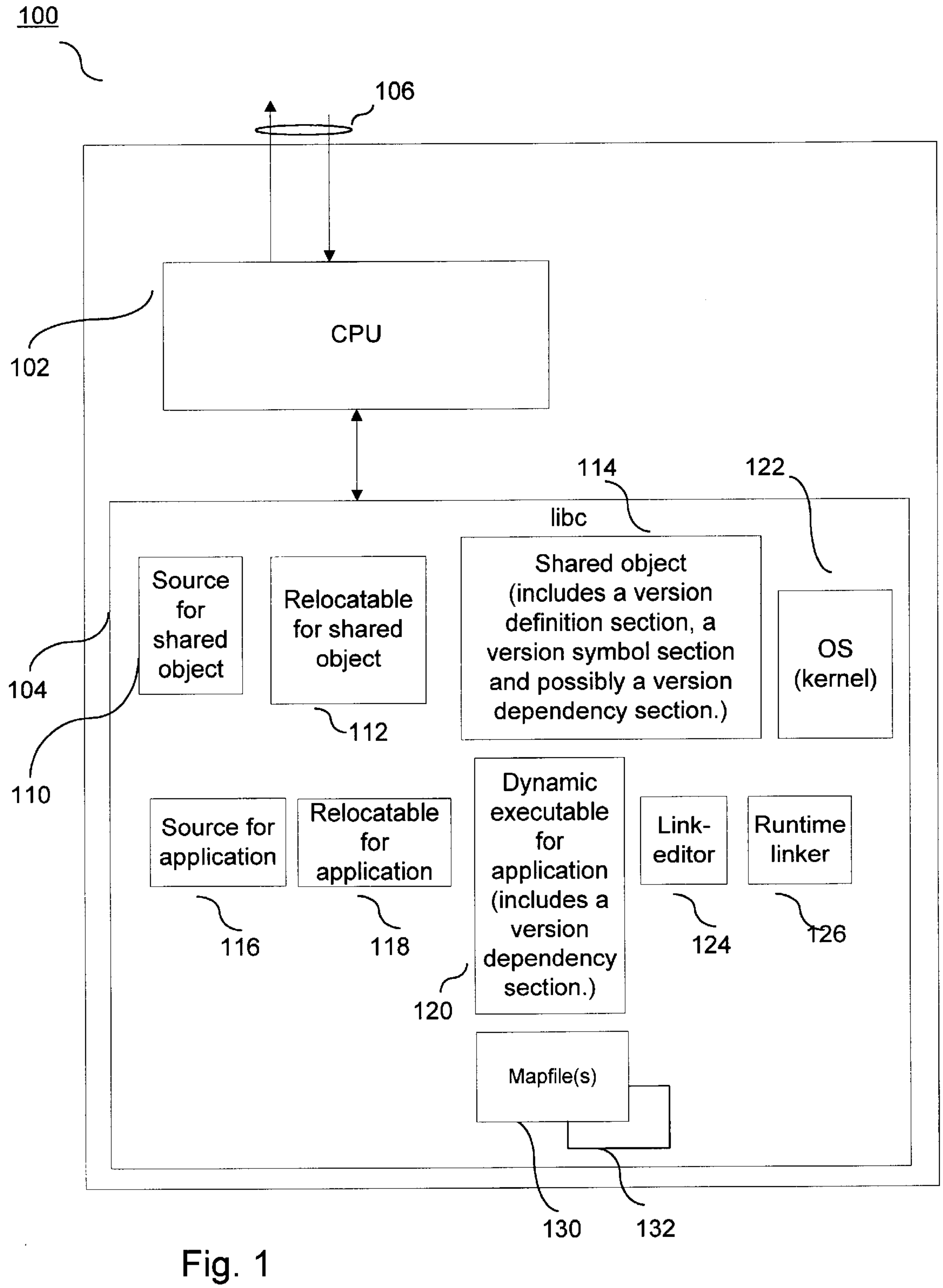
FIG. 1 is a block diagram of a computer system in accordance with the present invention.
Figure 2A:
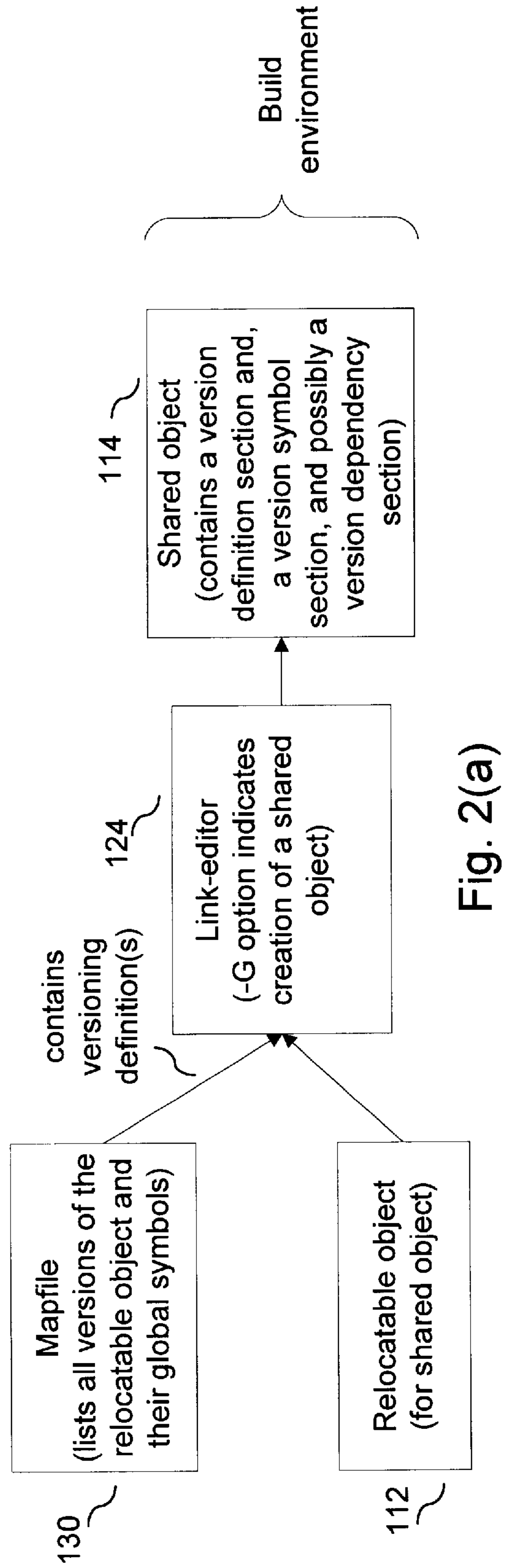
FIGS. 2(*a*), 2(*b*), and 2(*c*) are diagrams showing inputs and outputs of a link-editor program of FIG. 1 at build time.
Figure 2B:
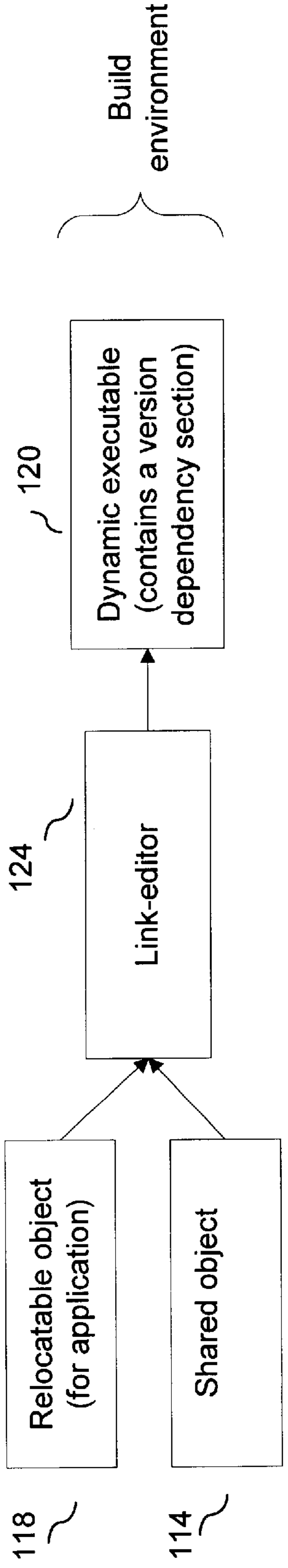
Figure 2C:
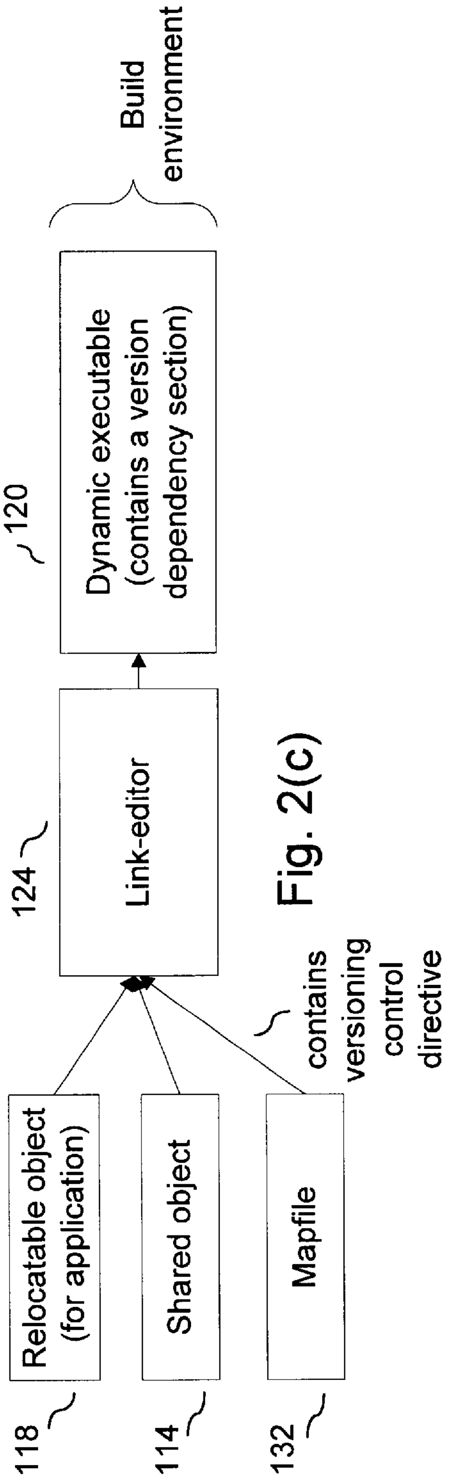
Figure 2D:
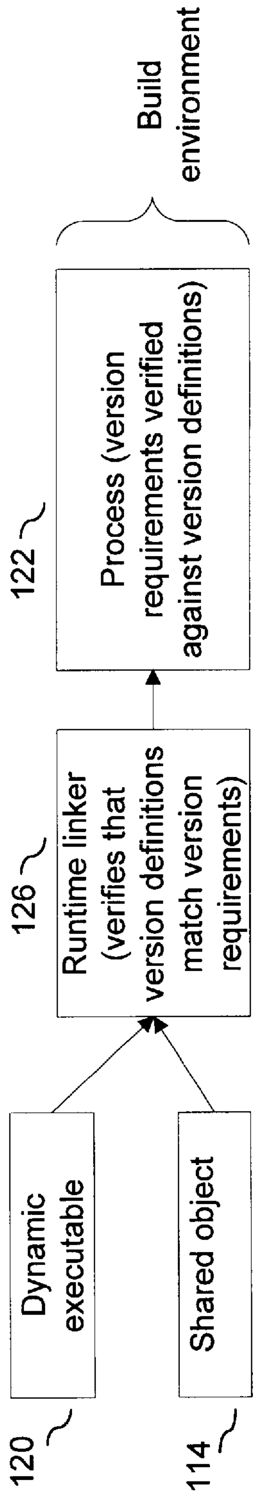

FIG. 1 is a block diagram of a computer system 100 in accordance with the present invention. Computer system 100 includes a CPU 102, a memory 104, and input/output lines 106. It will be understood by a person of ordinary skill in the art that computer system 100 can also include numerous elements not shown in the Figure for the sake of clarity, such as disk drives, keyboards, display devices, network connections, additional memory, additional CPUs, etc.

Memory 104 includes a library (libc) (also called a shared object) 114, source code 110 and relocatable (compiled) code 112 of shared object 114. Memory 104 further includes source code 116 for an application software program, relocatable (compiled) code 118 for application 116, and dynamic executable (linked) code 120 for application 116. Memory 104 further includes OS (kernel) software 122, mapfiles 130 and 132, a link-editor 124, and a runtime-linker 126. Each of shared object 114 and dynamic executable object 120 is created by link-editor 124. Each of shared object 114 and executable object 120 has an Executable Linking Format (ELF) similar to the ELF defined in "System V Application Binary Interface," third edition, published by Prentice Hall, Inc., which is herein incorporated by reference.

In the present invention, however, the ELF format of objects 114 and 120 has been augmented to include additional data, as described below. Shared object 114 has a format shown in FIG. 5. Dynamic executable object 120 has a format shown in FIG. 10. Shared object 114 includes versioning information (a version definition section) for each version of the shared object and a list of public symbols for each version (a version symbol section) as discussed below. Shared object 114 also may contain information concerning version dependencies (a version dependency section). Executable object 120 contains information concerning version dependencies (a version dependency section) as discussed below. A person of ordinary skill in the art will understand that memory 104 also contains additional information, such as application programs, operating systems, data, etc., which are not shown in the figure for the sake of clarity.

A preferred embodiment of the invention runs under the Solaris operating system, Version 2.5. Solaris is a registered trademark of Sun Microsystems, Inc. Unix is a registered trademark in the United States and other countries, exclusively licensed through X/OPEN, Ltd.

FIG. 2(*a*) is a diagram showing input and output of link-editor 124 of FIG. 1. FIG. 2(*a*) shows the creation of a versioned shared object. Although the following discussion deals with versioning for shared objects, the present invention can also be employed to implement versioning in dynamic executable objects and in relocatable objects. Thus, these types of objects can also contain a version definition section and a version symbol section. Link-editor 124 receives input of mapfile 130 and of relocatable object code 112 for a shared object and generates an output of shared object 114. Mapfile 130 specifies the global symbols and a version name for each version of the shared object. In the described embodiment, mapfile 130 preferably has the format of FIG. 4 and is created by a human being. In other embodiments, mapfile 130 may be created by the compilation system.

FIG. 2(*b*) shows additional input and output of link-editor 124 of FIG. 1. FIG. 2(*b*) shows the link-editing of an application program with the versioned shared object of FIG. 2(*a*). Link-editor 124 receives as input versioned shared object 114 and relocatable object 118. Link-editor 124 processes relocatable object 118 and shared object 114 to generate dynamic executable object 120. As shown in FIG. 2(*c*), a mapfile 132 also may be used in this step to indicate which versions of object 114 are allowed in this link procedure. Mapfile 132 preferably has the format of FIG. 9 and is created by a human being.

As shown in FIG. 2(*d*), at runtime, runtime-linker 126 verifies that all versions of shared object 114 needed by dynamic executable 120 are present. If so, runtime linker 126 creates and executes a process file 122 to execute dynamic executable 120. Thus, link-editor 124 builds versioned shared objects from relocatable objects and determines which versions of the shared object are needed by an application program. Runtime-linker 126 maps the objects in its memory and binds them together. Thus, runtime-linker 126 simply puts objects together as directed by link-editor 124. Runtime-linker 126 performs a verification check to insure that the version of shared object 114 required by dynamic executable 120 is present. If the correct version is not present, runtime-linker 126 generates an error.

The following paragraphs discuss types of changes that can be made between various versions of shared object 114. In general, these changes can be categorized into two groups: compatible updates and incompatible updates. Compatible updates are additive, i.e., all previously available global symbols in the interface to shared object 114 remain intact. An example of a compatible update is the addition of a global symbol. Because no symbols have been removed from previous versions, application software that interfaces with previous versions should still operate correctly. Incompatible updates change the existing interface to shared object 114 in such a way that existing applications using the interface can fail or can behave incorrectly. Examples of incompatible updates include: the removal of a symbol, the addition of an argument to a function, the removal of an argument from a function, and a change in size or content of an argument to a function. Bug fixes to shared object 114 may be compatible or incompatible with an existing interface. For example, a compatible bug fix may merely alter the internal function of shared object 114 while maintaining the previously defined interface. An incompatible bug fix may require the alteration of the interface to shared object 114.

2. Creating Versioning Information at Build Time

The preceding paragraphs provide a general discussion of the processes performed at build time and at runtime to implement versioning in accordance with the present invention. The following paragraphs discusses how link-editor 124 adds versioning information to a shared object and to the application program.

a. Creating a Versioning Definition for Versioned Objects at Build-Time

In a preferred embodiment, link-editor 124 controls versioning for shared objects in accordance with version directive information in mapfile 130, as discussed below. Mapfile 130 preferably is created by a human being, but also could be created by software such as a compilation system.

Figure 3A:
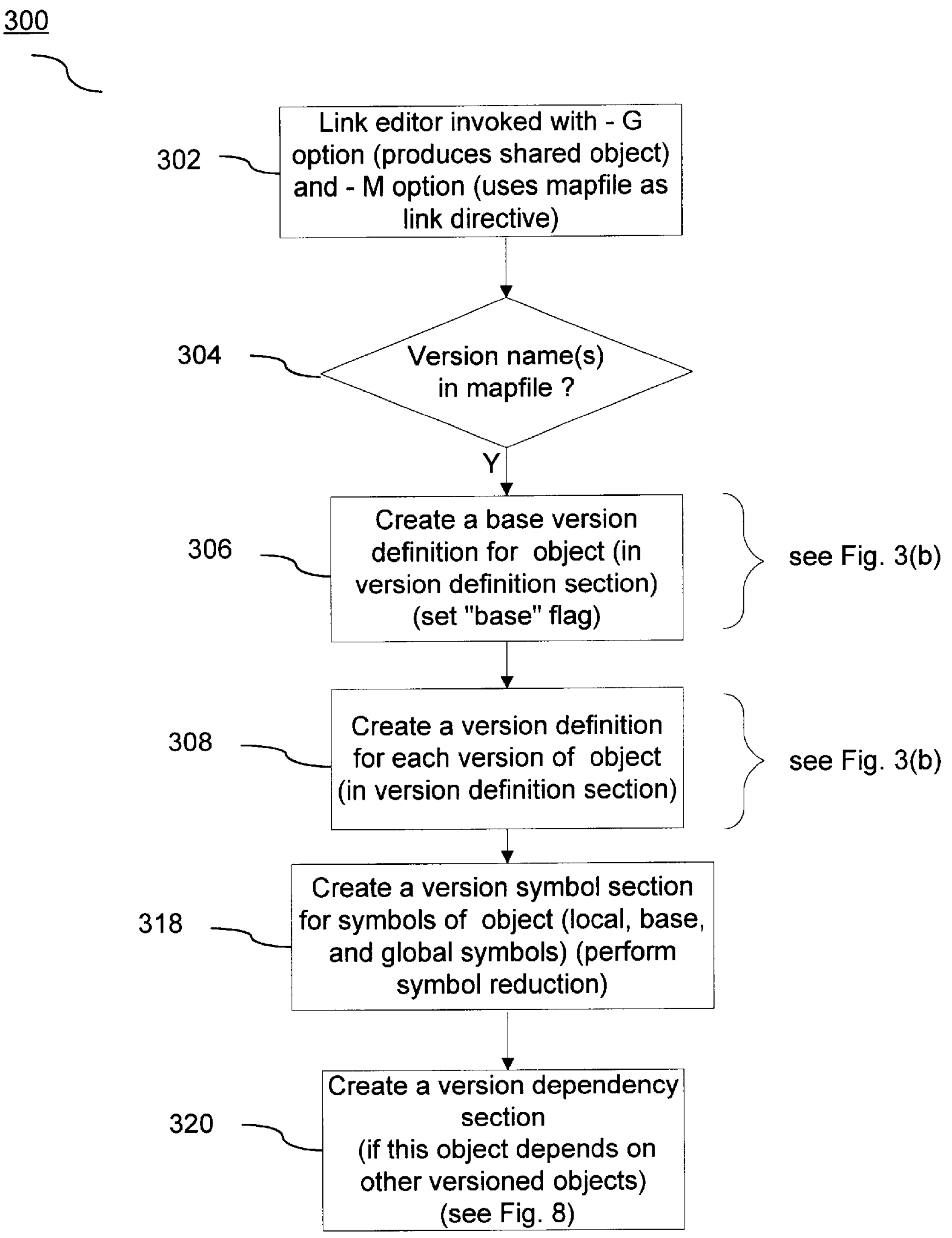
FIGS. 3(*a*) and 3(*b*) are flow charts showing steps performed by the link-editor of FIG. 2(*a*) to add a version definition section and a version symbol section to an object.
Figure 3B:
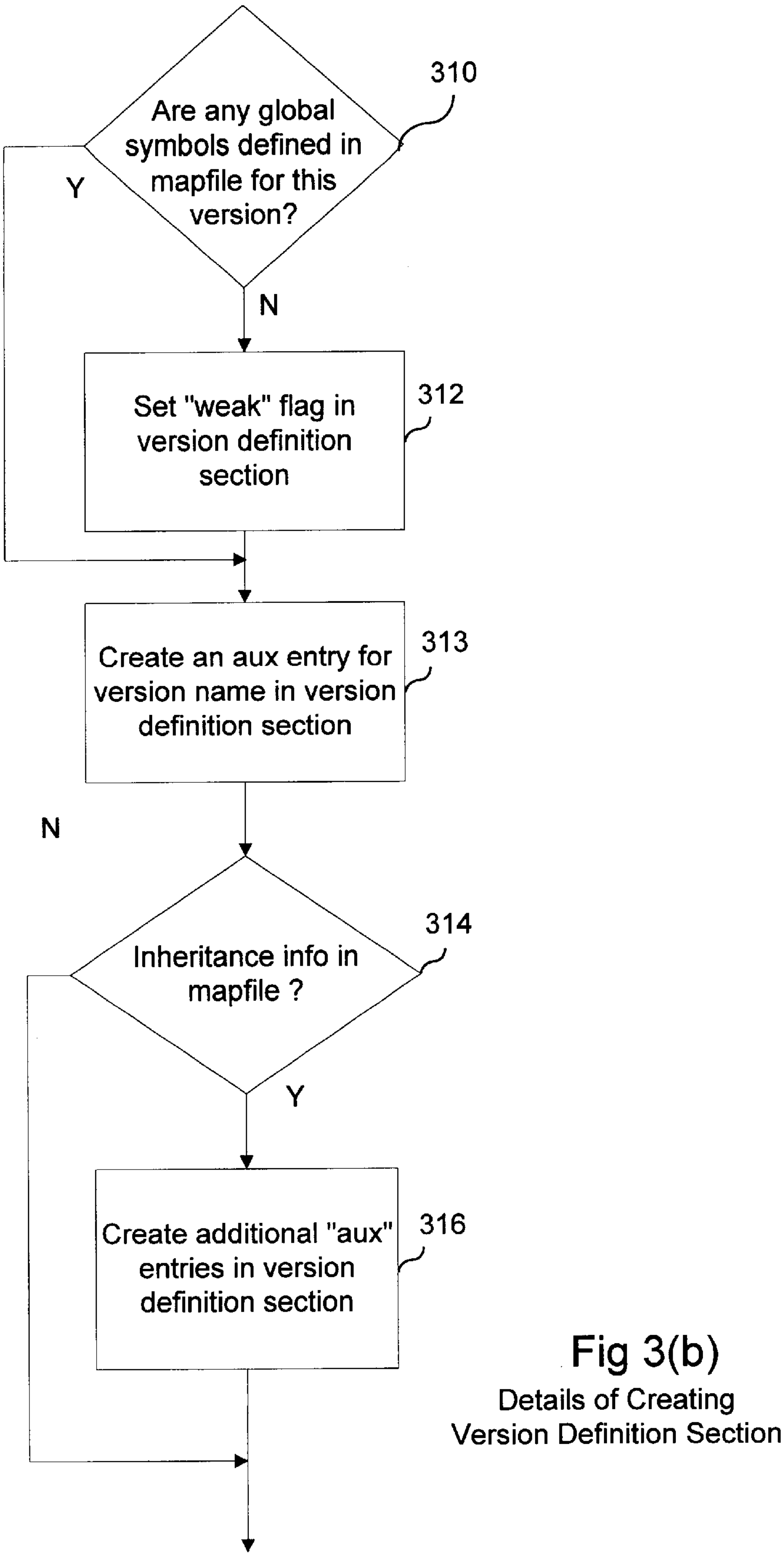

FIGS. 3(*a*) and 3(*b*) are flow charts showing steps performed by link-editor 124 of FIG. 2(*a*). These steps are part of the steps performed to create a versioned object, such as shared object 114. A person of ordinary skill in the art will understand that the steps of FIGS. 3(*a*) and 3(*b*), (as well as the steps of FIG. 8) are performed by CPU 102 of FIG. 1, executing instructions of link-editor 124 stored in memory 104 and using data structures stored, e.g., in memory 104.

As shown in step 302, the steps of FIG. 3(*a*) preferably are initiated when link-editor 124 is invoked with a -G option on a command line. The -G option indicates that linker-editor 124 should produce a shared object (as opposed to a dynamic executable object). In a preferred embodiment of the present invention, link-editor 124 also is invoked with the -M option, which indicates that mapfile 130 should be used as a source of "version definition directives." The example of FIG. 2(*a*) shows creation of a shared object, but the present invention can also be used to create versioned relocatable objects and versioned dynamic executable objects.

The following example does not include a detailed explanation of Unix commands used in the examples (cat, cc, pvs, ld). Unix commands are discussed in, the Solaris Reference Manual, which is available from Sun Microsystems. The following paragraphs discuss examples of shared object source code 110 and mapfile 130. Table 1 shows source code 110 for four source files ("foo.c", "data.c", "bar1.c", and "bar2.c") that are written in the C programming language. The source files collectively form a shared object. The mapfile of Table 2 defines global interfaces for various versions of the shared object. These files are compiled to form relocatable object 112 of FIG. 1. Thereafter, link-editor 124 creates a versioned shared object 114 in accordance with mapfile 130, as described below.

TABLE 1

(source code for shared object)

```
$ cat foo.c
extern const char * _foo1;
extern const char * _foo2;
void foo1( )
{
        (void) printf(_foo1);
}
void foo2( )
{
        (void) printf(_foo2);
}
$ cat data.c
const char * _foo1 = "string used by function foo1 ( )\n";
const char * _foo2 = "string used by function foo2 ( )\n";
$ cat bar1.c
extern void foo1( );
void bar1( )
{
        foo1( );
}
$ cat bar2.c
extern void foo2( );
void bar2( )
{
        foo2( );
}
```

TABLE 2

(Mapfile defining versions of shared object)

```
$ cat mapfile
SUNW.1.1 {                          #Release X
      global:
            foo1;
      local:
            *;
};
SUNW.1.2 {                          #Release X+ 1
      global:
            foo2;
} SUNW.1.1;
SUNW.1.2.1 { } SUNW.1.2;            #Release X + 2
SUNW.1.3a {                         #Release X + 3
      global:
            bar1;
} SUNW.1.2;
SUNW.1.3b {                         #Release X + 3
      global:
            bar2;
} SUNW.1.2;
SUNW.1.4 {
global:
bar3;
} SUNW.1.3a SUNW.1.3b
```

FIG. 4 shows a format of mapfile 130, using a format in which square brackets ("[" and "]") indicate an optional element.

Shared object 114 provides global symbols to which other objects, such as dynamic executable 120, can bind at runtime. These global symbols are specified in mapfile 130 and describe an Application Binary Interface (ABI) of shared object 114. During the lifetime of shared object 114, the interface of an object can change due to the addition or deletion of global symbols. In addition, the evolution of shared object 114 may involve internal implementation changes to shared object 114 that do not affect the global symbols of the interface.

Table 2 shows an example of mapfile 130. In Table 2, mapfile 130 contains version definitions for versions SUNW.1.1, SUNW.1.2, SUNW.1.2.1, SUNW.1.3a, SUNW.1.3b, and SUNW.1.4 of shared object 114. The version definitions include all versions (and their global symbols) ever defined for shared object 114. In the example, SUNW.1.1 is a version of shared object 114 contained in Release X; SUNW.1.2 is a version of shared object 114 contained in Release X+1, which inherits the global symbols of version SUNW.1.1. SUNW.1.2.1 is a version of shared object 114 contained in Release X+2, which inherits the global symbols of version SUNW.1.2. Note that SUNW.1.2.1 is a "weak" version because it does not contain any new global symbols. This version indicates an "implementation" change in the shared object. The other versions indicate "interface" changes. SUNW.1.2.1 represents a version having changes to the function of the shared object, but not to its interface.

SUNW.1.3a is a version of shared object 114 contained in Release X+3, which inherits the global symbols of version SUNW.1.2. SUNW.1.3b is also a part of Release X+3 and also inherits the global symbols of version SUNW.1.2. Version SUNW.1.3b, however, defines the global symbol "bar2", instead of the global symbol "bar1", which is defined in version SUNW.1.3a. Version SUNW.1.4 defines one global symbol "bar3" and also inherits the global symbols of both SUNW.1.3a and SUNW.1.3b.

In the example of Table 2, the symbol "foo1" is the only global symbol defined in the public interface of version SUNW.1.1. The special "auto-reduction" directive ("*") causes the reduction of all other global symbols of the shared object to have local scope so that they are not a part of the interface to the shared object. Thus, the public interface of shared object 114 for version SUNW.1.1 consists of the internal version definition for that version, associated with the global symbol "foo1".

Table 3 shows unix commands to compile and link the source code files of Table 1. The object codes files "foo.o", "data.o" "bar1.o", and "bar2.o" (not shown) are dynamically linked using mapfile 130 of Table 2 to produce a shared object 114 called "libfoo.so.1". (In this example, the cc compiler automatically calls the ld(1) link-editor 124.) The "-G" option on the command line indicates that link-editor 124 should produce a shared object, and not an executable object. The "ln" command creates a "compilation environment" name suitable for the "-1" option of ld(1). The "pvs" Unix command prints out the versioning information for the shared object created by link-editor 124 and the global symbols available for each version.

As shown in Table 3, a "base version" definition is also created for the object. This base version is defined using the name of the shared object itself (e.g., "libfoo.so.1"), and is used to associate any reserved symbols generated by the link-editor 124 with the object. In the example of Table 3, for instance, a base version definition is created for the shared object libfoo1.so.1 that contains reserved global symbols created by the linker (e.g.,_etext, _edata, _end, _DYNAMIC, PROCEDURE_LINKAGE_TABLE_, and GLOBAL_OFFSET_TABLE).

TABLE 3

(creating a versioned shared object (at build-time) and displaying the version information)

```
$ cc -o libfoo.so.1 -M inapfile -G foo.c bar1.c bar2.c data.c
$ ln -s libfoo.so.1 libfoo.so
$ pvs -dsv libfoo.so.1
      libfoo.so.1:
            _end;
            _GLOBAL_OFFSET_TABLE_;
            _DYNAMIC;
            _edata;
            _PROCEDURE_LINKAGE_TABLE_;
            _etext;
      SUNW.1.1:
            foo1;
            SUNW.1.1;
      SUNW.1.2:               {SUNW.1.1}:
            foo2;
            SUNW. 1.2;
      SUNW.1.2.1 [WEAK]:      {SUNW.1.2};
            SUNW. 1.2. 1;
      SUNW.1.3a:              {SUNW.1.2};
            bar1;
            SUNW.1.3a;
      SUNW.1.3b:              {SUNW.1.2};
            bar2;
            SUNW.1.3b;
      SUNW.1.4:               {SUNW.1.3a SUNW.1.3b};
            bar3;
            SUNW.1.4;
```

Figure 5:
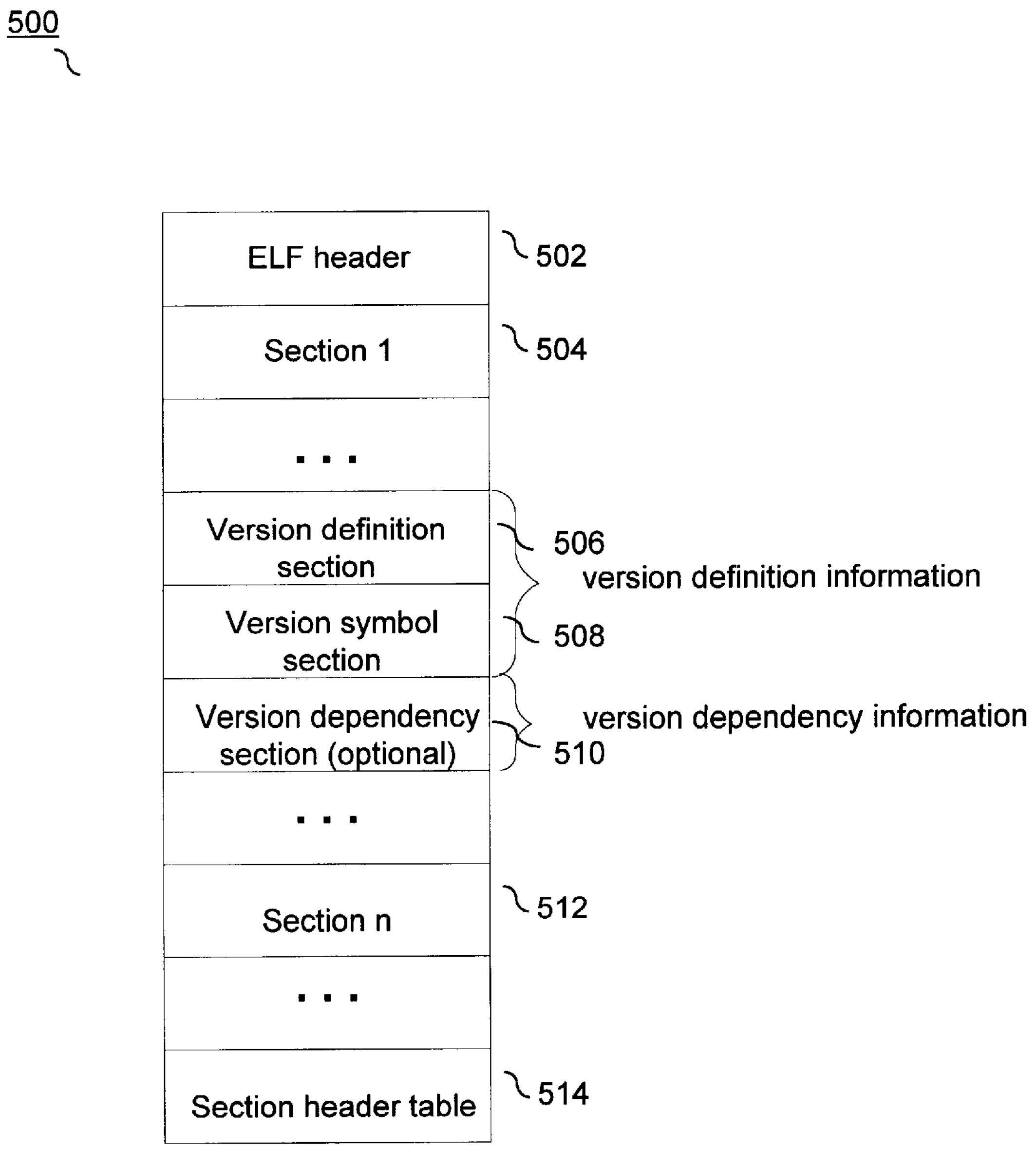
FIG. 5 shows an output of the link-editor of FIG. 2(*a*) that is included in a versioned object.

Returning to FIG. 3(*a*), if (in step 304) a version name appears in mapfile 130, link-editor 124 creates several sections within shared object 114 that specifically relate to versioning. The special sections are shown in FIG. 5 and include a version definition section 506, a version symbol section 508, and an optional version dependency section 510. The following paragraphs discuss the creation and use of these sections.

Figure 6:
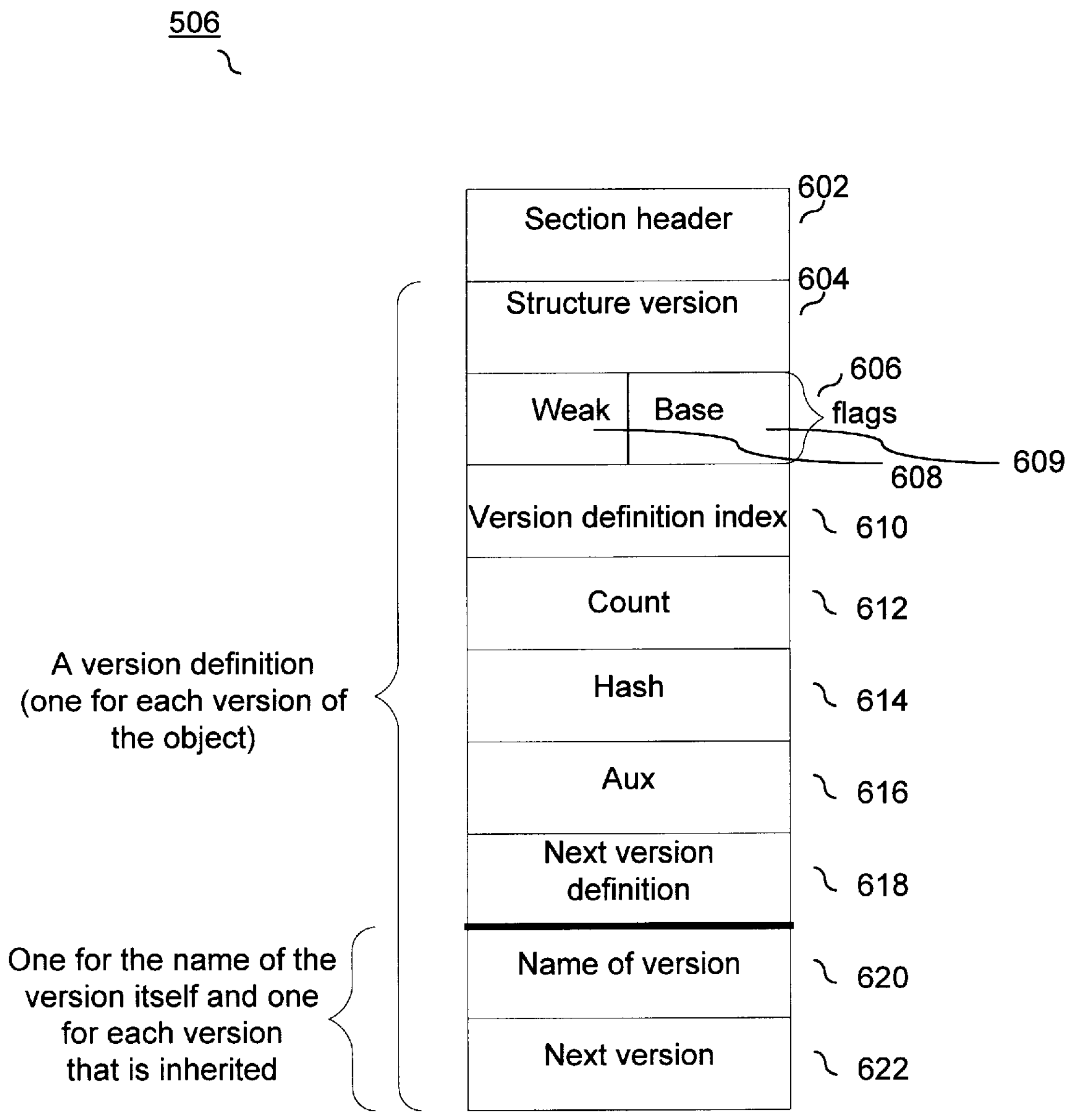
FIG. 6 shows a format of a version definition section of FIG. 5.
Figure 16:
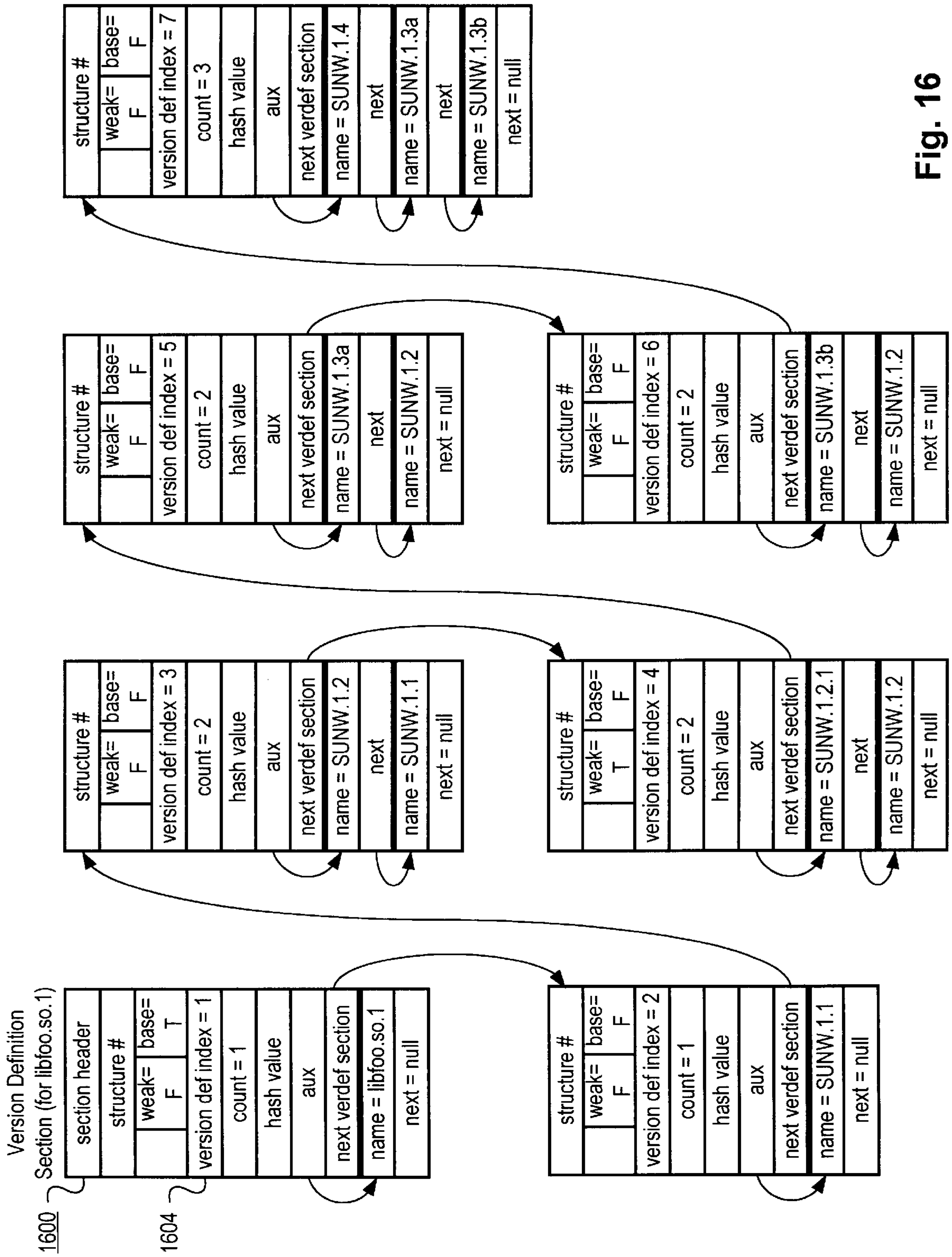
FIG. 16 is an example of a version definition section added to an object by the link-editor.

FIG. 6 shows a format of version definition section 506 of versioned shared object 114. FIG. 16 shows an example of a version definition section based on Tables 1–3. The section includes a section header 602 (see FIG. 12), a structure version 604, flags 606, a version S definition index 610, a count value 612, a hash value 614, an aux value 616, a next version definition pointer 618, the name of the version itself 620, and zero or more names of versions from which the defined version inherits global symbols 620, 622.

Each shared object 114 includes a single version definition section 506, containing multiple version definitions. Each group of fields 604–622 is called a "version definition". The following paragraphs discuss the contents of a version definition. Section header 602 indicates the number of versions of the shared object contained in the version definition section. Each version definition section includes information for a base version that defines global symbols not explicitly defined in the mapfile. Thus, fields 604–622 (a "version definition") are created for a base version in step 306 of FIG. 3(*a*). Field 609 ("base" flag) is set in this base version definition.

As shown in step 308, a version definition (fields 604–622) is created by link-editor 124 for each version of shared object 114 defined in mapfile 130. Thus, for the mapfile 130 of Table 2, six version definitions in addition to the base version definition are created in step 308. Steps 310–316 of FIG. 3(*b*) are performed for each version definition created in Steps 306, 308. As shown in step 310, if mapfile 130 does not define any global symbols for a version (see, e.g., SUNW.1.2.1 of Table 1), the "weak" flag 608 for that version definition is set in step 312 (see FIG. 16).

Version 604 is a version number of the structure itself. Version definition index 610 has a different (unique) value for each version defined for shared object 114 and will be discussed below in connection with FIG. 7. Count value 612 refers to the number of instances of pairs of fields 620 and 622 in this version. Hash value 614 is a hash value to the name of the version and uses a conventional ELF hashing function. Aux value 616 is an index to the first field 620 for this version. Next version definition 618 is an index to field 604 of the next version definition in the version definition section.

Step 313 creates an entry 620, 622 for the name of the current version and sets AUX to point to this entry. Thus, the first field 620 contains the version name of the version itself.

Inheritance information consists of one or more version names from which the defined version inherits other versions. In step 314 of FIG. 3(*b*), if mapfile 130 includes inheritance information, as shown in FIG. 4 and Table 2. In step 316 link-editor 124 creates one or more entries 620 and 622 to hold inheritance information. Fields 620 and 622 exist for each version from which a version inherits other versions. Field 620 includes the name of the inherited version definition and field 622 points to the next field 620 (or null).

Figure 7:
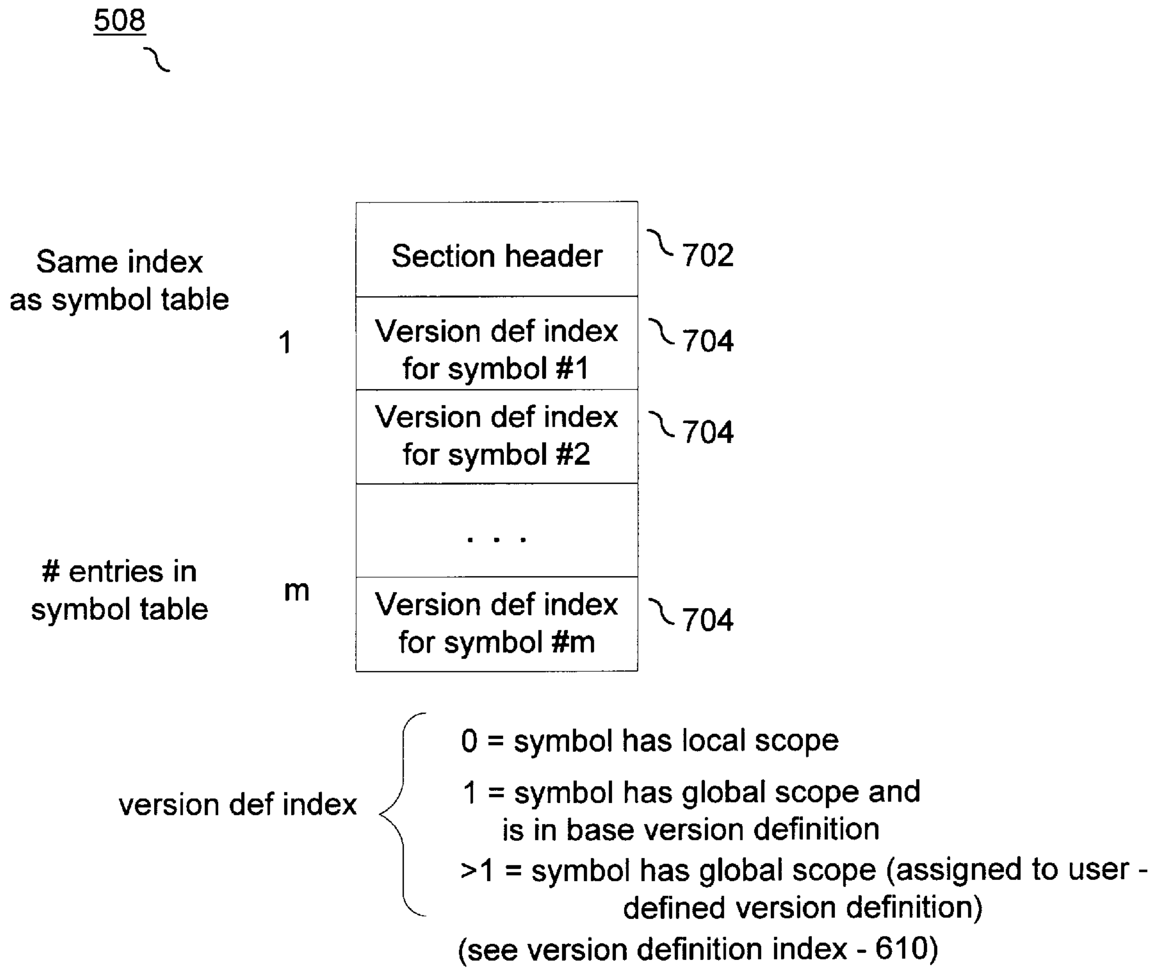
FIG. 7 shows a format of a version symbol section of FIG. 5.

In step 318 of FIG. 3(*a*), link-editor 124 creates a version symbol section for all symbols of the object being link-edited. FIG. 7 shows a format of a version symbol section 508. It is important to note that the entries in version symbol section 508 correspond one-to-one with the symbols in the symbol table for the object (see FIG. 17). Symbol tables are familiar to persons of ordinary skill in the art and are also described in the System V Application Binary Interface Manual, and will not be described herein. The format of section header 702 is discussed in connection with FIG. 13. Each entry 704 in version symbol section 508 is an index of the corresponding version for which the symbol is defined. Thus, referring to Table 2, if version SUNW.1.3b has an index 610 of "6" (see FIG. 16), then the entry in the version symbol section corresponding to the global symbol "bar2" will contain an entry of "6" (see FIG. 17). As indicated in FIG. 7, entries for symbols having local scope contain a value of "0". Entries for symbols in a base version definition contain an entry of "1". As discussed above, only symbols explicitly defined as global symbols (e.g., symbols for the base section, the names of each version, "foo1", "foo2", "bar1", and "bar2", and "bar 3") have non-zero entries 704 in version symbol section 508.

Step 320 of FIG. 3(*a*) creates a version dependency section for shared object 114 (if needed). For example, shared object 114 may reference other versioned objects. Creation of a version dependency section is discussed below.

b. Creation of Version Dependency Information at Build-Time

Table 4 shows an example of a source version of application program software 116 ("prog.c"). "Prog.c" references two global symbols in shared object 114 libfoo.so.1, namely: "foo1" and "foo2". These symbols are defined to be part of the interfaces SUNW.1.1 and SUNW.1.2, respectively. In Table 4, at build-time, compiler cc also initiates ld link-editor 124. At build time, a binding occurs between "prog.c" and versions "SUNW.1.1, SUNW.1.2 and SUNW.1.2.1, which contains the global symbols "foo1" and "foo2". The former two versions represent the symbol bindings. The latter is recorded due to its weak nature. Because no version control directives are specified by the compile/link command, link-editor 124 will check all versions of shared object 114 present when resolving global symbols in prog.c.

Figure 8:
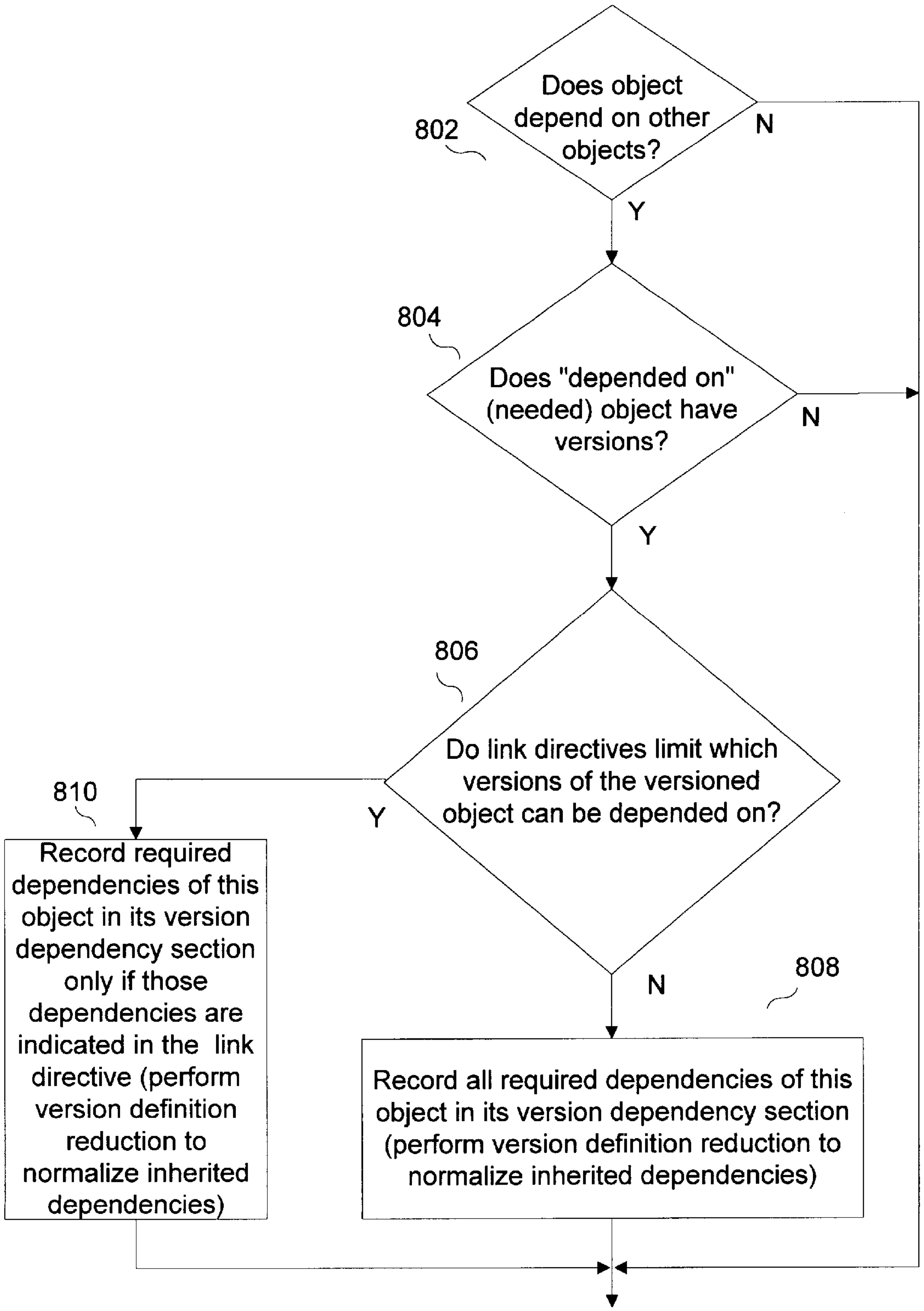
FIG. 8 is a flow chart showing steps performed by the link-editor of FIG. 2(*b*) or 2(*c*) to add a version dependency section to a dynamic executable application program.
Figure 10:
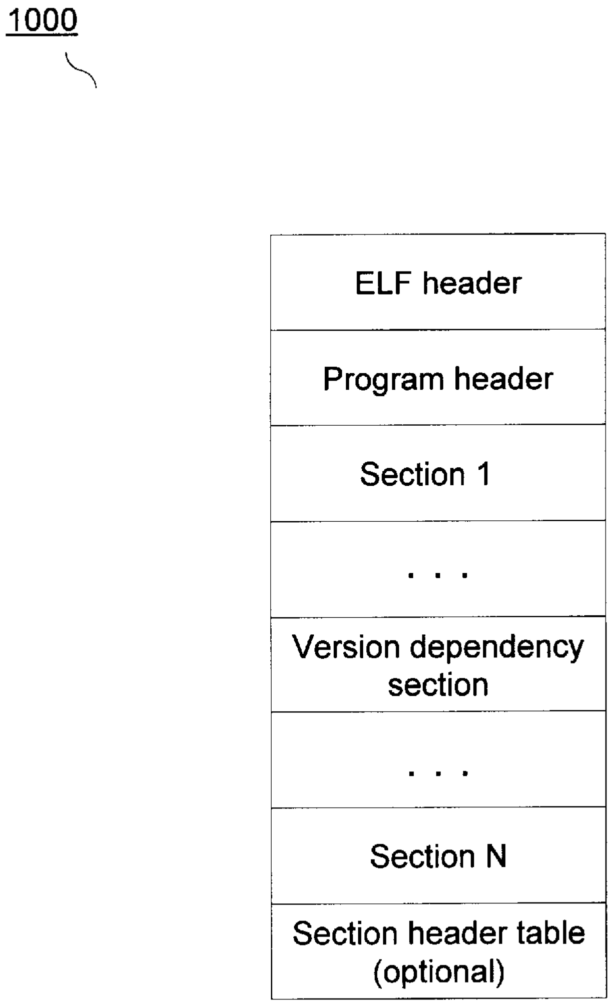
FIG. 10 shows an output of the link-editor of FIG. 2(*b*) that is included in a dynamical executable application program.
Figure 11:
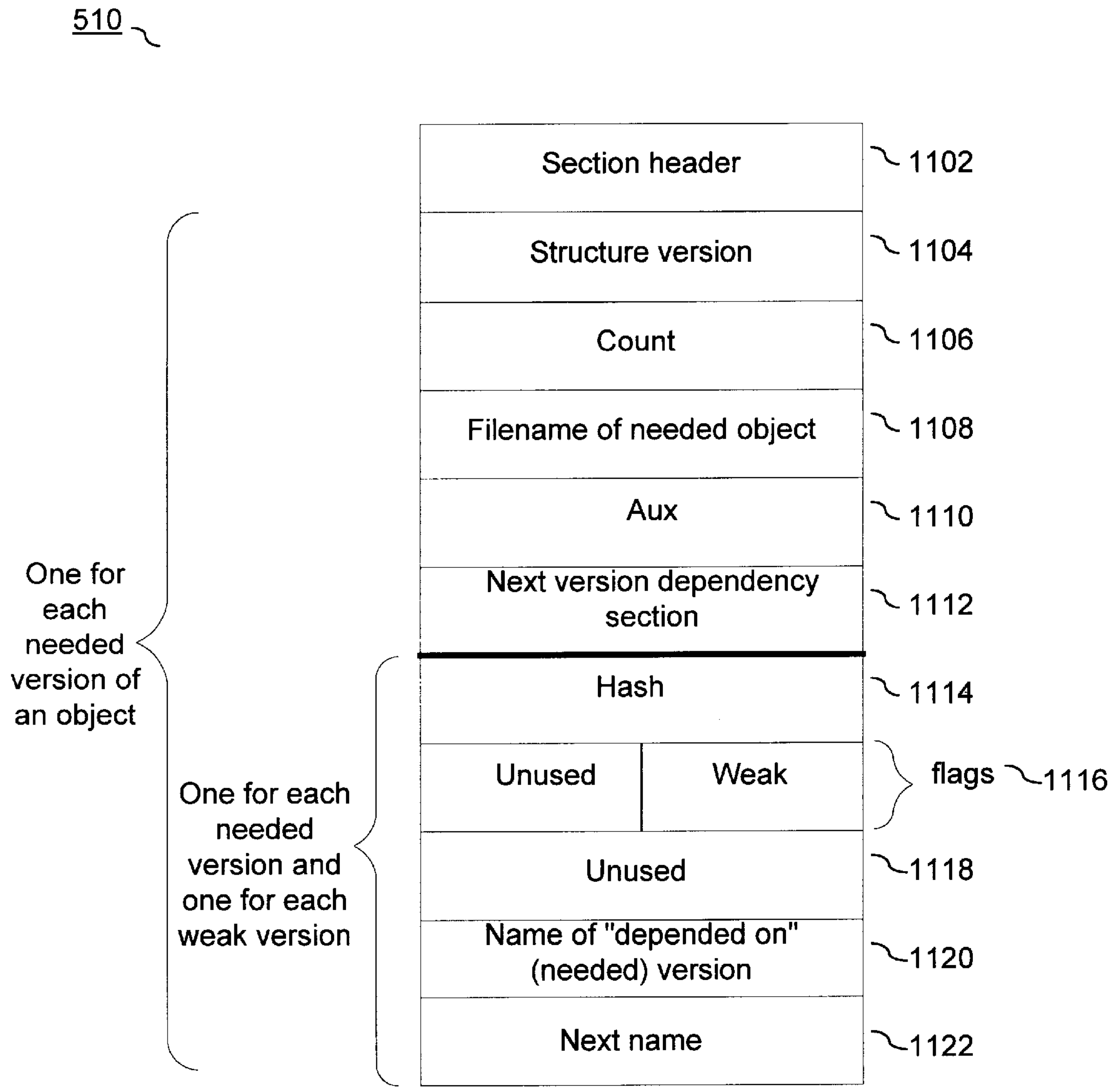
FIG. 11 shows a format of a version dependency section of FIGS. 5 and 10.

FIG. 8 shows steps performed by link-editor 124 at build time to create dynamic executable ELF file 120 from relocatable object 118 and shared object 114. The format of dynamic executable ELF file 120 is shown in FIG. 10. The format of FIG. 10 is similar to that of FIG. 5, except that FIG. 10 contains a version dependency section, but no version definition section or version symbol section. FIG. 11 shows a format of version dependency section 510.

TABLE 4

(Source code for an application program and linking to an object)

```
$ cat prog.c
extern void foo1( );
extern void foo2( );
main ( )
{
    foo1( );
    foo2( );
}
$ cc -o prog prog.c -L. -R. -lfoo
$ pvs -r prog
    libfoo.so.1 {SUNW.1.2 SUNW.1.2.1);
```

In step 802 of FIG. 8, link-editor 124 determines whether the object being linked (e.g., prog) depends on other objects (e.g., libfoo1.so.1) by checking for unresolved global symbols in prog against the global symbol table of the other objects being linked. If so, in step 804, link-editor 124 determines whether the needed object has versions i.e., whether the needed object has a version definition section. If, in step 806, link-editor 124 determines that only certain versions of the needed object are visible to link-editor 124, control passes to step 810. Otherwise, control passes to step 808.

In step 808, link-editor 124 creates a version dependency section in dynamic executable 120 by looking at all available version definition sections of shared object 114 to determine which of these versions contains the global symbols required by relocatable object 118. Alternatively, mapfile 132 has identified only certain versions as being visible to link-editor 124. In step 810, link-editor 124 only looks at the visible version definition sections of shared object 114 to determine which of these versions contains the global symbols required by relocatable object 118. This provision allows linking to be restricted to specific versions of shared object 114.

The dependencies recorded in the version dependency section of FIG. 10 are created whenever an application program references a global symbol in the interface to a shared object. Table 4 shows an example of a source version of application program software 116 ("prog.c"). Application program "prog.c" references global symbols "foo1", which is defined in version SUNW.1.1, and "foo2", which is defined in version SUNW.1.2 (see Table 2). Thus, a dependency exists between prog.c and SUNW.1.2 (which inherits from SUNW.1.1). Link-editor 124 creates a version dependency section in the dynamic executable 120 of prog indicating that it depends on version SUNW.1.2 (see FIG. 18). For each undefined global symbol in relocatable 118, link-editor 124 obtains the information telling where (in which version) the symbol is located by looking at the version definition section and version symbol section of all shared objects that are being linked with relocatable 118.

FIG. 11 shows a format for version dependency section 510. Version dependency section 510 includes a section header 1102, as described in connection with FIG. 12, a structure version 1104, a count value 1106, a filename 1108, and aux value 1110, a next version value 1112, and a plurality of instances of fields 1114–1122. Fields 1114–1122 include a hash value 1114, a "weak" flag 1116, an unused field 1118, a name field 1120, and a next name field 1122.

Structure version value 1104 is not related to the versioning of the present invention, as discussed above in connection with FIG. 6. Count value 1106 indicates a number of instances of fields 1114–1122. Filename 1108 is a name of a shared object dependency. Aux value 1110 is an index to the first field 1114 for this version. Next version dependency section value 1112 is an index to the next version field 1104 (or null). Each instance of fields 1114–1122 identifies a version that is required by the object being created. A version is required if it defines global symbols referenced by the object. At least one instance of fields 1114–1122 always exists.

Hash value 1114 is generated from the name of the version 1120 and is generated using a conventional ELF hashing function. "Weak" flag 1116 indicates whether the version depended upon is a weak version, i.e., whether the version contains no global symbols. Field 1118 may not occur in all implementations of the invention and is included merely for alignment purposes. A first instance of name field 1120 contains a name of the version itself (e.g., "SUNW.1.2"). Next name field 1122 is a pointer to a next hash value 1114.

A current implementation of the invention uses "version reduction", in which not all inheritances are recorded in version dependency section 510. Weak versions are recorded and needed version are recorded. When these versions inherit global symbols from other versions, however, the other versions generally are not recorded. For example, inheritance from a first weak version though a second weak version preferably is reduced before being recorded in fields 920, 922. Similarly, inheritance from a first non-weak version though a second non-weak version preferably is reduced before being recorded. Inheritance between a weak and a non-weak version is not reduced. Thus, SUNW.1.2 is recorded in fields 920, 922, but the inheritance from SUNW.1.1 is not recorded. In addition, a dependency upon weak version SUNW.1.2.1 is recorded.

FIGS. 12–14 show various aspects of the sections of FIGS. 6, 7, and 11. Not all fields of FIGS. 12–14 will be described herein, as many of these fields are part of the conventional ELF format. Only fields relevant to the present invention will be discussed. FIG. 12 shows a format of a section header used in section headers 602, 702, and 1102. An "sh_name" field 1202 holds a name of a section and an "sh_type" field 1204 holds a type of the section. Values 1202 are particularly relevant to the present invention. FIG. 13 shows values indicating the various type values in field 1204. Values 1302 are particularly relevant to the present invention. The section header format of FIG. 12 also includes an "sh_size" field 1306, which indicates a number of bytes in the section, an "sh_link" field 1308, and an "sh_info" field 1310. FIG. 14 shows example values for the "sh_type", "sh_link", and "sh_info" fields. Values 1402 are particularly relevant to the present invention.

The previous paragraphs discuss creation, at build time, of an ELF object 114 containing version definition section 506 and version symbol section 508, and further discuss creation of an ELF object 120 containing version dependency section 510. It should be understood that sections 506 and 508 are created only in objects containing definitions of global symbols and section 510 is created only in objects that depend on objects containing global symbols. Thus, a shared object having global interfaces will include sections 506 and 508 and possibly section 510. Executable application programs that reference the shared object will include section 510 only.

TABLE 5

| (Linking using a mapfile to specify which version is "legal" to link to) |
|---|
| $ cat mapfile |
| libfoo.so - SUNW.1.1; |
| cc -o prog prog.c -M mapfile -L. -R. -lfoo |
| Undefined first referenced |
| symbol in file |
| foo2 prog.o (symbol belongs to \ |
| unavailable version ./libfoo.so (SUNW.1.2)) |
| 1d: fatal: Symbol referencing errors. No output written to prog |

c. Restricting an Application's Build At Build Time

The previous paragraphs discuss an example of version binding between a relocatable and all available versions of shared object 114. Binding can also be restricted to occur between an application program and only a particular version of an object. FIG. 9 shows a format of a file control directive in the mapfile 132 of FIG. 2(*c*). A file control directive of this format is used to bind a dynamical executable object in accordance with a specific version of another object. As shown in FIG. 2(*c*) and Table 5, if the link-editor is run with mapfile 132 containing a file directive of the format shown in FIG. 9, then binding will occur only with the specified version of the object. In Table 5, the mapfile contains "libfoo.so - SUNW.1.1". As shown in Table 4, application software "prog.c" references global symbols "foo1" and "foo2". Symbol "foo2" is defined in version SUNW.1.2. When prog.c is linked (using the cc compiler and ld(1) link-editor) with an -M option, it is linked only with version SUNW.1.1. Thus, as shown in Table 5, link-editor 124 identifies "foo2", which is defined in version SUNW.1.2, as an undefined symbol.

d. Promoting a Weak Version At Build Time

Table 6 shows an example in which link-editor 124 is forced to "promote" a weak version (SUNW.1.2.1) to a strong version. Because of the "-u" option, command line link-editor 124 records a dependency of "prog" on version SUNW.1.2.1 in the version dependency section of "prog". Furthermore, "weak" flag 1116 is set to false for SUNW.1.2.1 in the version dependency section of "prog". In this case version SUNW.1.2.1 inherits version SUNW.1.2. Therefore, as all of prog's dependencies are "strong" Version reduction will mean that only SUNW.1.2.1 is recorded in prog and that it will be recorded as non-weak. Promotion of a weak version ensures that runtime linker 126 will verify that the formerly weak version is present when "prog" is executed.

TABLE 6

| (Promotion of a weak version) |
|---|
| $ cc -o prog prog.c -L. -R. -u SUNW.1.2.1 -1foo<br>$pvs - r prog<br>libfoo.so.1 (SUNW.1.2.1) |

3. Verifying Versioning Information at Runtime

Figure 15:
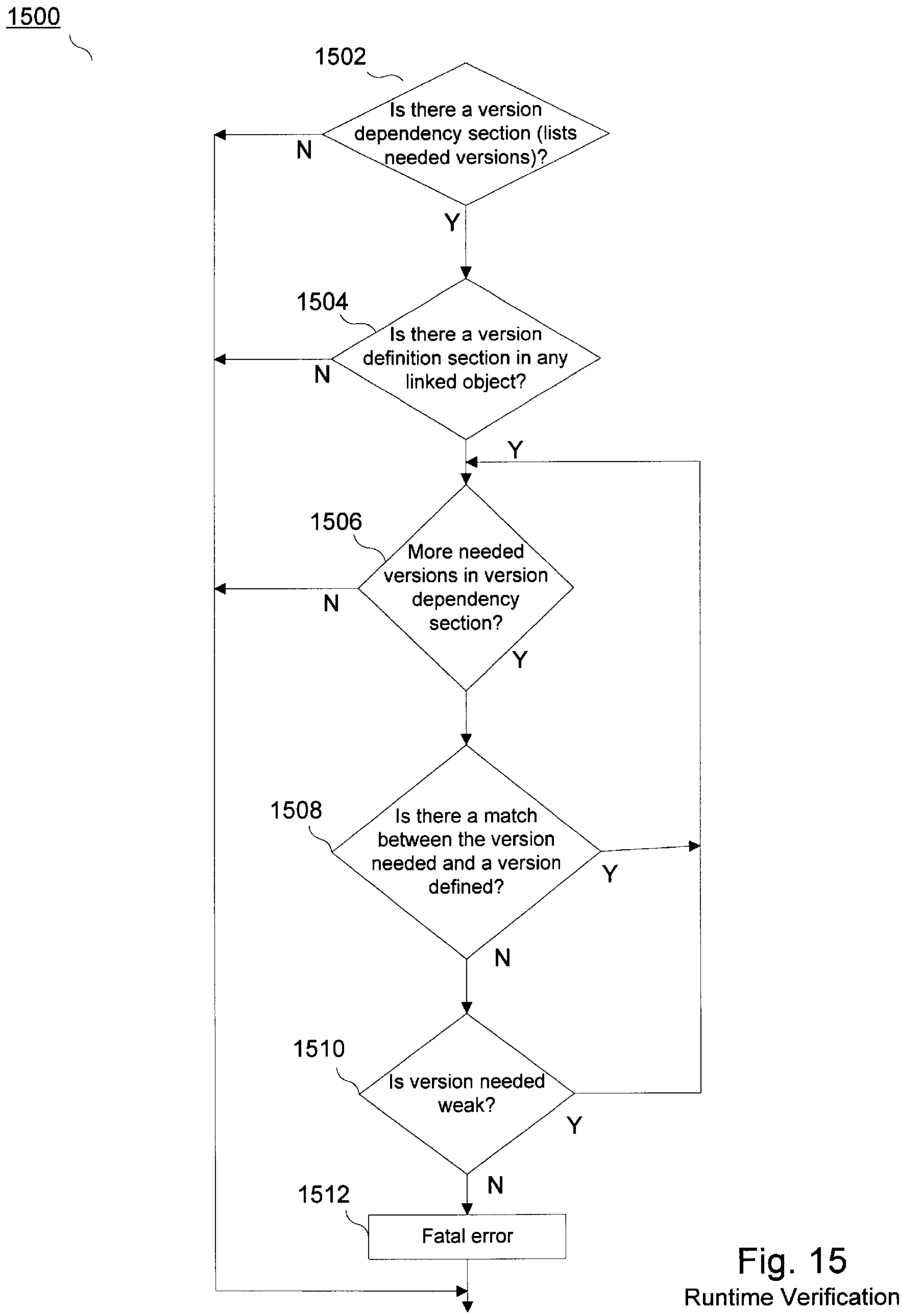
FIG. 15 is a flow chart of steps performed by the runtime linker of FIG. 2(*d*) to verify that the version requirements of a application program match the versions present in an object being linked to the application program.

FIG. 15 is a flow chart 1500 showing steps performed by runtime linker 126 (see FIG. 2(*d*)) to insure that all required versions of referenced objects are present when linking and executing a dynamic executable object 120. The steps of FIG. 15 preferably are embodied by CPU 102 executing instructions stored in a memory. The steps of FIG. 15 are performed as a pre-execution check to determine whether all required dependencies are present.

In step 1502, linker 126 determines whether the dynamic executable object being executed contains a version dependency section (see FIG. 11). If not, no checking is done and normal execution continues. Otherwise, in step 1504, linker 126 determines whether at least one of the objects 114 being linked includes a version definition section and a version symbol section. If not, no further checking is done and normal execution continues. Otherwise control passes to step 1506.

In step 1506, runtime linker 126 determines whether all version dependencies in the current dynamic executable object have been processed. If so, normal execution continues, otherwise control passes to step 1508.

In step 1508, runtime linker 126 determines whether a match exists between a needed version (as defined in the version dependency section of the dynamic executable 120) and the version definition section of the shared object 114. For example, in FIGS. 16 and 18, version SUNW.1.2 and SUNW.1.2.1 are defined in the version definition section of shared object 114 and are specified as needed in the version dependency section of dynamic executable 120.

If a match is found in step 1508, then the needed version of object 114 is present and control returns to step 1506. Otherwise, the needed version is not present and it is necessary to determine whether the missing version is a weak or a non-weak version in step 1510. Runtime linker 126 determines whether a version is weak by checking the "weak" flag 1116 in the version dependency section of dynamic executable 120. (Note that flag 1116 may reflect the "promotion" of a version from weak to strong). If, in step 1510, runtime linker 126 determines that the version is a weak version, no error occurs and control returns to step 1506. Otherwise, a fatal error occurs because a needed, non-weak version is not present. Thus, a dependency on a missing "weak" version will not cause an error, but dependency on a missing "non-weak" version will.

Figure 17:
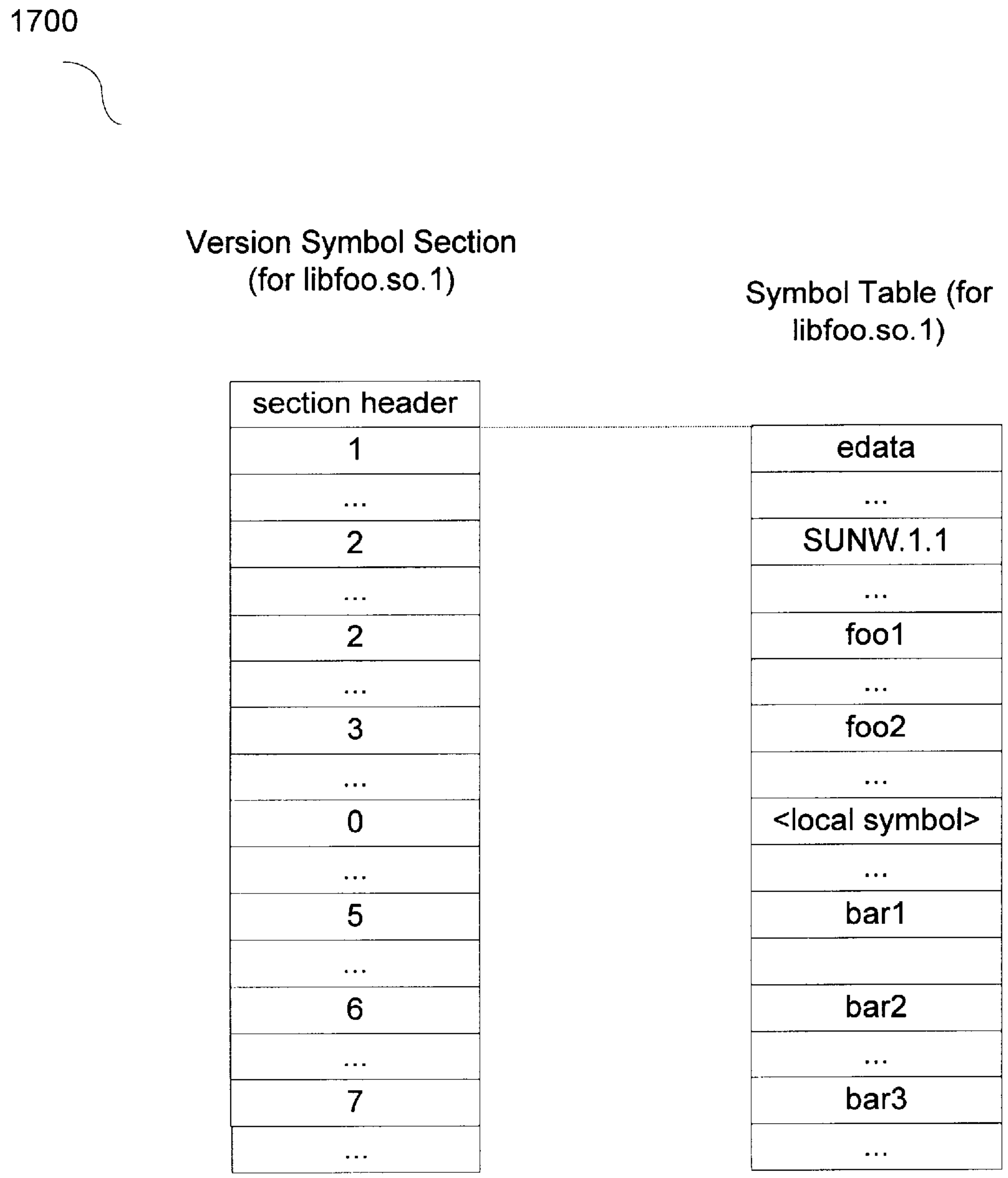
FIG. 17 is an example of a version symbol section added to an object by the link-editor.

FIG. 16 shows an example of a version definition section 1600. FIG. 17 shows an example of a version symbol section 1700 for shared object 114 (libfoo.so.1 of Tables 1–3). FIG. 19 also shows an example of a version dependency section 1800 for the dynamical executable form of application program 120 ("prog" of Table 4). (In this example, shared object 14 has no dependencies on other objects, and so has no version dependency section).

FIG. 16 contains a base version definition 1604 and six version definitions for, respectively, versions SUNW.1.1, SUNW.1.2, SUNW.1.2.1, SUNW.1.3a, SUNW.1.3b, and SUNW.1.4. Base version definition 1604 has its "base" flag set to "True". The version definition for SUNW.1.2.1 has its "weak" flag set to "True". Each version definition has a respective (unique) version definition index.

Version reduction is applied in the version definition table. Application "prog" references the global symbols foo1 (in SUNW.1.1) and foo2 (in SUNW.1.2). Because SUNW.1.2 inherits the global symbols of SUNW.1.1, link-editor 124 applies version reduction and an entry (for SUNW.1.2) is made in version definition section. The weak version SUNW.1.2.1 is also recorded.

FIG. 17 shows some of the symbols in version symbol section 1700. For example, the global variable "foo1" is defined in version SUNW.1.1, which has a version definition index of "2". Thus, the entry in the version symbol section corresponding to the entry in the symbol table for foo1 contains "2". In the described embodiment, the name for each version (e.g., SUNW.1.1) is also a global symbol that is created when generating the version definition.

Figure 18:
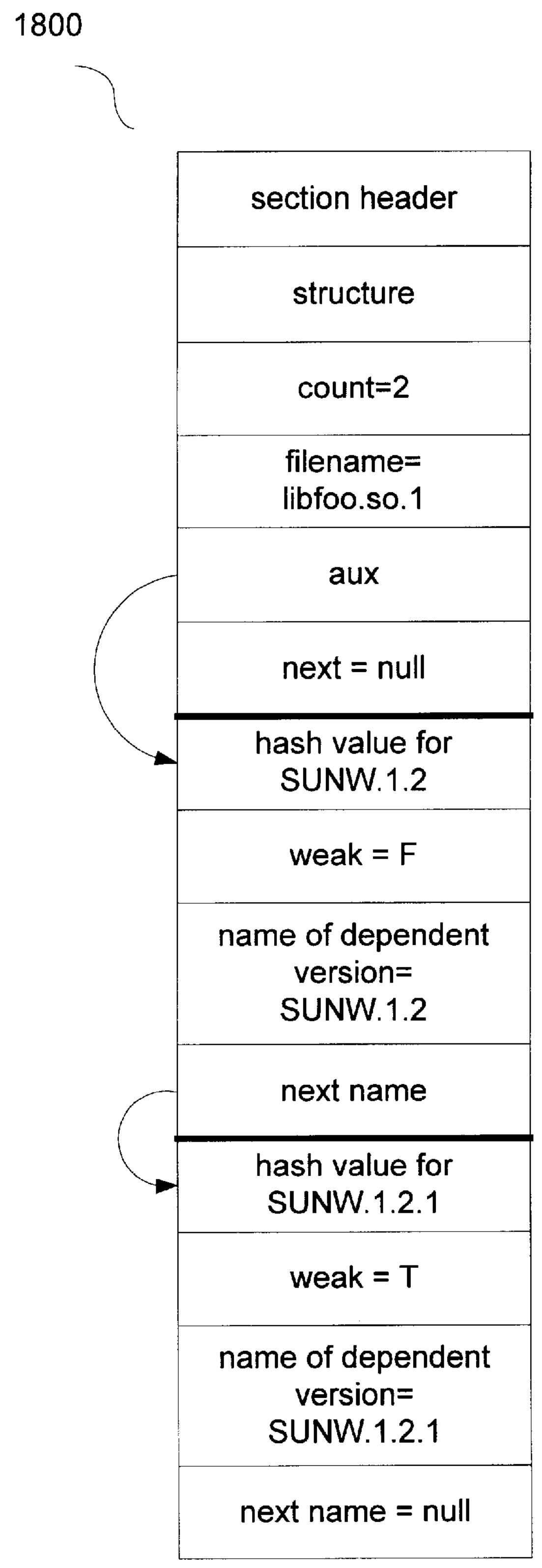
FIG. 18 is an example of a version dependency section, which can be added to either or both of a versioned object or a dynamic executable application program by the link-editor.

FIG. 18 shows an example of a version dependency section in dynamic executable 120. Because of version reduction, the section contains an entry for SUNW.1.2, but not for SUNW.1.1. The section also contains an entry for "weak" version SUNW.1.2.1. At runtime, linker 126 will determine that prog has a version dependency section (step 1502), will determine that libfoo.so.1 has a version definition section (step 1504), and will determine that the needed version (SUNW.1.2) is present (step 1508). Therefore, "prog" will be executed.

Several preferred embodiments of the present invention have been described. Nevertheless, it will be understood that various modifications may be made without departing from the spirit and scope of the invention.

In describing the preferred embodiments, a number of specific technologies used to implement the embodiments of various aspects of the invention were identified and related to more general terms in which the invention was described. However, it should be understood that such specificity is not intended to limit the scope of the claimed invention.

What is claimed is:

1. A method for providing versioning information in a software program, comprising the steps performed by a data processing system, of:

providing first object code for a first software program;

providing a mapfile, separate from the object code, specifying a version name associated with a version of the first software program, the mapfile further specifying global symbols that form an interface of the version of the first software program; and linking the first object code, so that an addition is made to the first object code, in accordance with the mapfile, of information identifying the version name of the first software program, to yield a versioned object, the linking step further including the step of adding information to the first object code, in accordance with the mapfile information, the information identifying the global symbols forming the interface of the version.

2. The method of claim 1, further comprising the steps of:

providing second object code for a second software program; and linking the second object code to the versioned object, wherein the linking step further includes the steps of:

determining a version of the first software program needed by the second software program, and adding to the second object code, information specifying the version needed by the second software program, to yield a dynamic executable program.

3. The method of claim 2, further comprising the steps of:

prior to executing the dynamic executable program, determining whether the needed version in the dynamic executable program matches the version identified in the versioned object; and executing the dynamic executable program, wherein the dynamic executable program calls the needed version of the versioned object.

4. The method of claim 2, wherein the determining step further includes the step of determining a version of the first software program needed by the second software program, by determining which global symbols are needed by the second software program and determining, by checking the information in the versioned object, which versions the needed global symbols are in.

5. The method of claim 2, wherein the information added to the second object code is a version dependency section.

6. The method of claim 1, wherein the information added to the first object code is a version definition section.

7. The method of claim 1, wherein the information added to the first object code is a version symbol section.

8. The method of claim 1, wherein the versioned object is a relocatable object.

9. The method of claim 1, wherein the versioned object is a dynamic executable object.

10. The method of claim 1, wherein the versioned object is a shared object.

11. An apparatus for providing versioning information in a software program, comprising:

a storage medium holding object code for a first software program;

a storage medium holding a mapfile, separate from the object code, specifying a version name associated with a version of the first software program, the mapfile further specifying global symbols that form an interface of the version of the first software program; and a linker configured to provide additional information in the first object code, in accordance with the mapfile, the additional information defining the version name of the version of the first software program, to yield a versioned object, the linker further configured to add information to the first object code, in accordance with the mapfile information, the information identifying the global symbols forming the interface of the version.

12. The apparatus of claim 11, further comprising:

a storage medium holding second object code for a second software program; and a linker configured to link the second object code to the versioned object to yield a dynamic executable program, by adding additional information to the second object code specifying the version needed by the second software program.

13. The apparatus of claim 12, further comprising:

a run-time linker configured to provide execution of the dynamic executable program if the run-time linker determines that the needed version specified in the dynamic executable program matches the version defined in the versioned object.

14. The apparatus of claim 11, wherein the versioned object is a relocatable object.

15. The apparatus of claim 11, wherein the versioned object is a dynamic executable object.

16. The apparatus of claim 11, wherein the versioned object is a shared object.

17. A computer program product, comprising:

a computer usable medium having computer readable code embodied therein for causing a determination that a version of an object required by a dynamic executable program is present during execution of the dynamic executable program, the computer program product comprising:

computer readable program code devices configured to cause a computer to effect provision of first object code for a first software program;

computer readable program code devices configured to cause a computer to effect provision of a mapfile, separate from the object code, specifying a version name associated with a version of the first software program, the mapfile further specifying global symbols that form an interface of the version of the first software program; and computer readable program code devices configured to cause a computer to effect linking the first object code so that an addition is made to the first object code, in accordance with the mapfile, of information identifying the version name of the version of the first software program, to yield a versioned object, and further configured to add information to the first object code, in accordance with the mapfile information, the information identifying the global symbols forming the interface of the version.

18. The computer program product of claim 17, further comprising:

computer readable program code devices configured to cause a computer to effect provision of second object code for a second software program; and computer readable program code devices configured to cause a computer to effect linking the second object code to the versioned object, by determining a version of the first software program needed by the second software program, and adding to the second object code, information specifying the version needed by the second software program, to yield a dynamic executable program.

19. The computer program product of claim 18, further comprising:

computer readable program code devices configured to cause a computer to effect a determination of whether the version needed by the dynamic executable program to effect execution of program matches the version defined in the versioned object; and configured to execute the dynamic executable program, wherein the dynamic executable program calls the needed version of the versioned object.

* * * * *